US007411472B1

United States Patent
West et al.

(10) Patent No.: US 7,411,472 B1
(45) Date of Patent: Aug. 12, 2008

(54) LOW-LOSS INTEGRATED WAVEGUIDE FEED FOR WAFER-SCALE HETEROGENEOUS LAYERED ACTIVE ELECTRONICALLY SCANNED ARRAY

(75) Inventors: James B. West, Cedar Rapids, IA (US); Ross K. Wilcoxon, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 330 days.

(21) Appl. No.: 11/344,852

(22) Filed: Feb. 1, 2006

(51) Int. Cl.
 *H01P 5/12* (2006.01)
 *H01Q 13/10* (2006.01)
 *H01Q 3/00* (2006.01)
(52) U.S. Cl. .................. 333/125; 343/754; 343/771; 342/368
(58) Field of Classification Search ........... 333/125; 343/754, 771; 342/368
See application file for complete search history.

(56) References Cited

U.S. PATENT DOCUMENTS 6,232,920 B1 * 5/2001 Brookner et al. .......... 342/372
6,421,021 B1 * 7/2002 Rupp et al. ................ 343/753
6,677,899 B1 * 1/2004 Lee et al. .................. 342/376

OTHER PUBLICATIONS

"Wafer-Scale Integration Brings Low Cost and a Small Footprint to Active Antenna Arrays", by Fred Mohamadi, RF Design, Feb. 2005.
"Breaking the Thermal Barrier in Microelectronics" News Link, Institute of Microelectronics, Oct. 2004, p. 3.

* cited by examiner

*Primary Examiner*—Robert J. Pascal
*Assistant Examiner*—Kimberly E Glenn
(74) *Attorney, Agent, or Firm*—Nathan O. Jensen; Kyle Eppele

(57) ABSTRACT

A wafer-scale heterogeneous layered active electronically scanned array (ESA) utilizes a low-loss integrated waveguide feed. The ESA is formed from wafer-scale subarray modules each of which comprises a multilayer stack to form transmit/receive (T/R) modules. Waveguide subarray combiners feed the T/R modules. A subarray combiner is a waveguide assembly bonded to a bottom layer in the multilayer stack. The bottom layer is a ground plane forming a top waveguide broadwall of the combiner. The waveguide subarray combiner may be formed from a variety of waveguide types and feeds the T/R modules using electric field probe coupling or an aperture slot coupling. A second layer feed structure forms the subarray modules into the ESA and feeds the waveguide subarray combiners. The second layer feed structure uses waveguides to feed the waveguide subarray combiners using E-field probes or aperture slot coupling on the bottom waveguide broadwall.

23 Claims, 5 Drawing Sheets

LOW-LOSS INTEGRATED WAVEGUIDE FEED FOR WAFER-SCALE HETEROGENEOUS LAYERED ACTIVE ELECTRONICALLY SCANNED ARRAY

BACKGROUND OF THE INVENTION

This invention relates to antennas, phased array antennas, and specifically to a wafer-scale heterogeneous layered active electronically scanned array (ESA) with a low-loss, integrated waveguide feed.

Electronically scanned arrays or phased array antennas offer significant system level performance enhancements for advanced communications, data link, radar, and SATCOM systems. The ability to rapidly scan the radiation pattern of the ESA allows the realization of multi-mode operation, LPI/LPD (low probability of intercept and detection), and A/J (antijam) capabilities. One of the major challenges in ESA design is to provide cost effective antenna array phase shifting methods and techniques along with dual-band operation of the ESA.

It is well known within the art that the operation of a phased array is approximated to the first order as the product of the array factor and the radiation element pattern as shown in Equation 1 for a linear array.

$$E_A(\theta) \equiv \underbrace{E_p(\theta, \phi)}_{\substack{\text{Radiation} \\ \text{Element} \\ \text{Pattern}}} \underbrace{\left[\frac{\exp\left(-j\frac{2\pi r_o}{\lambda}\right)}{r_o}\right]}_{\substack{\text{Isotropic} \\ \text{Element} \\ \text{Pattern}}} \cdot \underbrace{\sum_N A_n \exp\left[-j\frac{2\pi}{\lambda} n\Delta x(\sin\theta - \sin\theta_o)\right]}_{\text{Array Factor}} \qquad \text{Equation 1}$$

Standard spherical coordinates are used in Equation 1 and θ is the scan angle referenced to bore sight of the array. Introducing phase shift at all radiating elements within the array changes the argument of the array factor exponential term in Equation 1, which in turns steers the main beam from its nominal position. Phase shifters are RF devices or circuits that provide the required variation in electrical phase. Array element spacing is related to the operating wavelength and it sets the scan performance of the array. All radiating element patterns are assumed to be identical for the ideal case where mutual coupling between elements does not exist. The array factor describes the performance of an array of isotropic radiators arranged in a prescribed two-dimensional rectangular grid.

Wafer scale integration is a system known in the art for building very large integrated circuit networks that use an entire silicon wafer to produce a circuit function. The large size and reduced packaging requirements needed with wafer scale integration makes possible reduced costs and increased performance for some applications.

Wafer scale integration has been proposed for fabricating an active antenna array. "Wafer-Scale Integration Brings Low Cost and a Small Footprint to Active Antenna Arrays," by Fred Mohamadi, RF Design, February 2005 discloses a 256-element steerable antenna array on an eight-inch wafer. The wafer scale array module disclosed provides transmit and receive functions and a steerable 16 by 16 element antenna on the eight-inch wafer. The wafer scale integration concept disclosed comprises a radiating element layer, a device layer and a signal distribution layer. The RF interconnection layer uses coplanar waveguide (CPW) or shield microstrip transmission lines. One of the problems with the coplanar waveguides and microstrip feed implementations at the subarray level are the large losses.

What is needed is a low-loss active electronically scanned antenna (ESA) feed that is compatible with a heterogeneous wafer-scale stacked active transmit/receive (T/R) subarray modules. Furthermore what is needed is a second layer low-loss combining scheme to tile the subarrays into arbitrarily sized non-conformal apertures.

SUMMARY OF THE INVENTION

A wafer-scale heterogeneous layered active electronically scanned array (ESA) is disclosed. The ESA comprises a plurality of wafer-scale subarray modules, a plurality of waveguide subarray combiners for feeding the plurality of subarray modules, and a second layer feed structure for forming the plurality of subarray modules into the ESA and for feeding the plurality of waveguide subarray combiners.

Each subarray module of the plurality of wafer-scale subarray modules comprises a multilayer stack forming a plurality of transmit/receive (T/R) modules. Each T/R module of the plurality of T/R modules is fed by a waveguide subarray combiner of the plurality of waveguide subarray combiners. The integrated multilayer stack comprises an antenna layer, a switch 2 layer, a power amplifier (PA) layer, and a switch 1 and low noise amplifier (LNA) layer.

Each waveguide subarray combiner of the plurality of waveguide subarray combiners comprises a waveguide assembly bonded to a bottom layer in the multilayer stack. The bottom layer comprises a ground plane that forms a top waveguide broadwall of the waveguide subarray combiner. The waveguide subarray combiner further comprises sidewalls and a bottom waveguide broadwall.

The waveguide subarray combiner is formed from single ridge waveguides, dielectric filled rectangular waveguides, dielectric filled single ridge waveguides, dual ridge waveguides, or dielectric filled dual ridge waveguides. The waveguide subarray combiner feeds the T/R modules in the wafer stack subarray module using electric field probe coupling or aperture slot coupling.

The second layer feed structure comprises a plurality of waveguides formed between high thermal conductivity materials to feed the waveguide subarray combiners attached to the plurality of subarray modules by means of E-field probes or aperture slot coupling. The second layer feed structure further comprises bias and control lines disposed on the high thermal conductivity material to supply the subarray modules.

The wafer-scale heterogeneous layered active ESA comprises a second layer beam steering computer for subarray module beam steering by commands to T/R modules in the plurality of subarray modules.

It is an object of the present invention to provide a wafer-scale heterogeneous layered active ESA utilizing a low-loss integrated waveguide feed.

It is an object of the present invention to provide a low-loss combining scheme to tile wafer-scale subarray modules into an arbitrarily sized aperture.

It is an advantage of the present invention to utilize wafer-scale integration to reduce cost and increase performance.

It is an advantage of the present invention to reduce the number of interconnection line requirements in an electrically large ESA.

It is a feature of the present invention to reduce losses in a wafer-scale ESA.

It is a feature of the present invention to provide a low-cost wafer-scale ESA with simple construction.

BRIEF DESCRIPTION OF THE DRAWINGS

The invention may be more fully understood by reading the following description of the preferred embodiments of the invention in conjunction with the appended drawings wherein:

FIG. 3b is an end view of the waveguide with E-field probe of FIG. 3a;

DETAILED DESCRIPTION

The present invention is for a wafer-scale heterogeneous layered active electronically scanned array (ESA) with a low-loss integrated waveguide feed.

Figure 1:
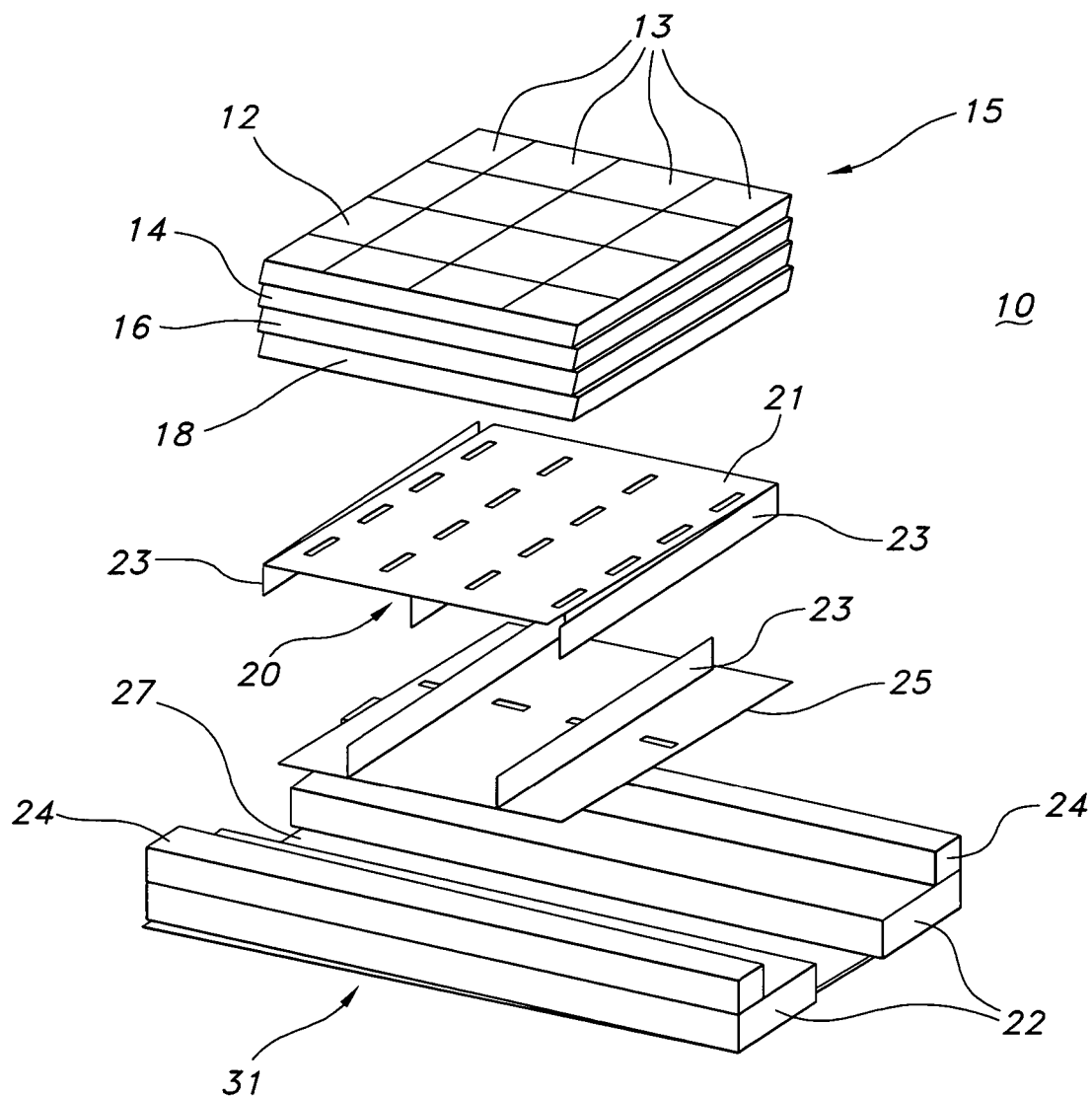
FIG. 1 shows a portion of a wafer-scale heterogeneous layered active electronically scanned array (ESA) with a wafer-scale subarray module that is fed by a waveguide subarray combiner.

FIG. 1 shows a portion of a wafer-scale heterogeneous layered active electronically scanned array (ESA) 10 with a wafer-scale subarray module 15 that is fed by a waveguide subarray combiner 20. The wafer-scale subarray module 15 is a stand-alone integrated multilayer m×m or m×n stack of transmit/receive (T/R) modules 13 vertically oriented within a cell with $\lambda/2 \times \lambda/2$ spacing. The $\lambda/2 \times \lambda/2$ (free space) spacing is crucial to prevent grating lobes. The waveguide subarray combiner 20 feeds each of the T/R modules 13 in the subarray module 15. The subarray module 15 in FIG. 1 is shown with 16 T/R modules in a 4×4 array. Larger or smaller arrays of T/R modules 13 may also be used.

The wafer-scale subarray module 15 may be made up of an antenna layer 12, a switch 2 layer 14, a power amplifier (PA) layer 16, and a switch 1 and a bottom layer 18 that may be a low noise amplifier (LNA) layer. The switch layers 1 and 2 may be optional. Optional additional layers (not shown) may be added for control and signal processing functions as required. The antenna layer 12 may be deposited on the subarray surface. The antenna layer 12 may also be a separate multi-layer printed circuit board assembly. Internal interconnect between the layers may be done by using benzocyclobutene (BCB) copper (Cu) transposer layers. A first-level beam steering capability is contained within the subarray module 15 and the subarray module 15 may be extendable to digital beam forming by additional layers.

Figure 2:
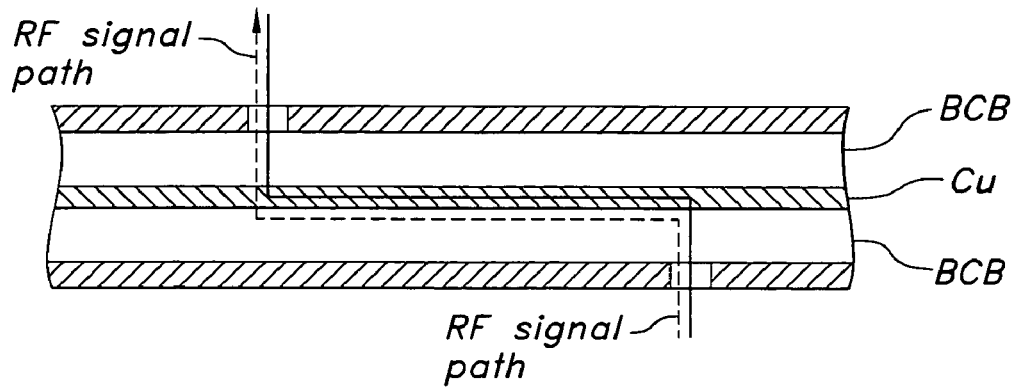
FIG. 2 shows how benzocyclobutene (BCB) copper (Cu) layers are formed with a multi-layer process that deposits a film of low-loss dielectric material.

The BCB—Cu layers are formed with a multi-layer process that deposits a film of low-loss dielectric material (BCB) as shown in FIG. 2. The second step is to deposit a layer of copper (Cu) metallization traces for electric interconnection. The third step deposits a second dielectric layer (BCB). The end result is horizontal conductive traces with isolation from the top (or bottom) of the subarray module 15 in FIG. 1. This embedded interconnect scheme has the advantage of not requiring a one-to-one vertical connection between the layers it is meant to interconnect. The BCB—Cu process is one specific process for forming the subarray module 15. Other wafer stack interconnect processes known in the art may also be used.

The waveguide subarray combiner 20 is a waveguide assembly that is bumped or metallurgically bonded to the subarray module 15 in FIG. 1. The subarray module 15 bottom layer 18 has a lower ground plane that forms a top waveguide broadwall 21 of the waveguide subarray combiner 20. The waveguide broadwall surface 21 of the waveguide subarray combiner 20 can either be formed by metallization of the bottom layer 18 during the wafer stack process flow or it can be a separate metallization, as shown detached from the bottom layer 18 in the exploded view of FIG. 1. Sidewalls 23 and bottom waveguide broadwall 25 form the rest of the waveguide subarray combiner 20. The sidewalls 23 may all be bonded to the bottom waveguide broadwall 25, the top waveguide broadwall 21 or with a portion on the top 21 and the bottom 25 as shown in FIG. 1. The sidewalls 23 may be fabricated integral to top or bottom waveguide metallic surfaces. The waveguide subarray combiner 20 is formed from four individual waveguides in FIG. 1 to feed the 4×4 array of T/R modules 13. The number of individual waveguides is increased or decreased depending on the arrangement and the number of T/R modules 13.

Coupling between the T/R modules 13 in the wafer stack subarray module 15 and the waveguide subarray combiner 20 can be accomplished in the following ways. Electric field probe coupling, where probes are deposited, plated, or as separate posts metallurgically bonded to the active RF layers such as the bottom layer 18 in the lower regions of the subarray module 15. Standard aperture (slot) coupling between the lower regions of subarray module 15 and the waveguide subarray combiner 20 may also be used.

Figure 3A:
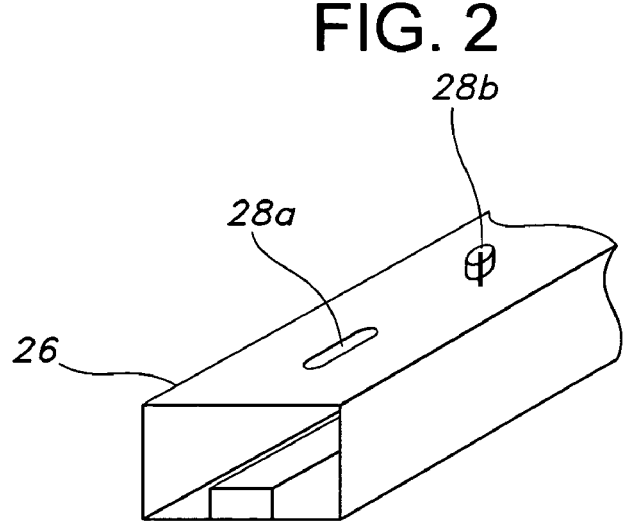
FIG. 3a shows a single ridge wave guide with aperture coupling or E-field probe coupling to T/R modules in the subarray module.
Figure 3B:
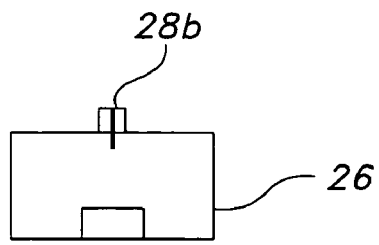
Figure 4:
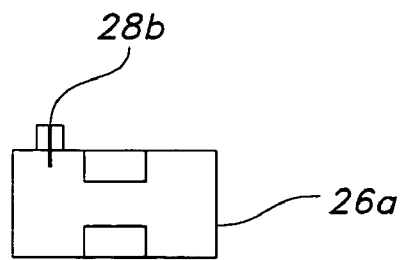
FIG. 4 illustrates a dual ridge waveguide with the E-field probe offset to feed the T/R modules.
Figure 5:
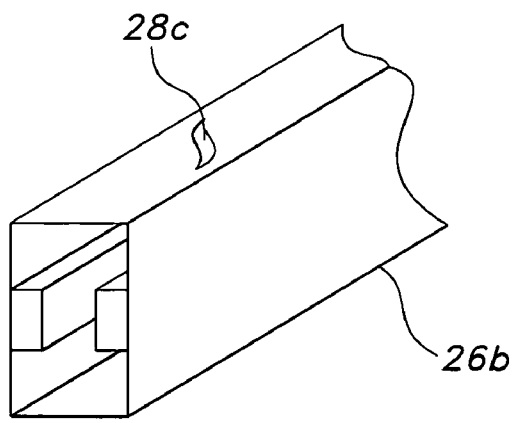
FIG. 5 shows narrow wall slot coupling with a resonant slot in a waveguide that may be a rectangular single ridge or double ridge with either air or dielectric loading to feed the T/R modules.

Waveguide subarray combiner 20 embodiments for broadwall 21 coupling to the T/R modules 13 in the subarray module 15 include single ridge waveguides, dielectric filled rectangular waveguides, and dielectric filled single ridge waveguides and others known in the art for the four waveguides in FIG. 1. FIG. 3a shows a single ridge wave guide 26 with aperture coupling 28a or E-field probe coupling 28b to the T/R modules 13 in subarray module 15. The waveguide 26 may be dielectrically loaded. FIG. 3b is an end view of waveguide 26 with the E-field probe 28b. The E-field probe 28b may be offset from center line of the waveguide 26 to adjust coupling. The T/R modules may be fed with a dual ridge waveguide 26a with the E-field probe 28b offset as shown in FIG. 4. FIG. 5 shows narrow wall slot coupling with a resonant slot 28c in a waveguide 26b that may be a rectangular single ridge or double ridge (as shown) with either air or dielectric loading.

Figure 6:
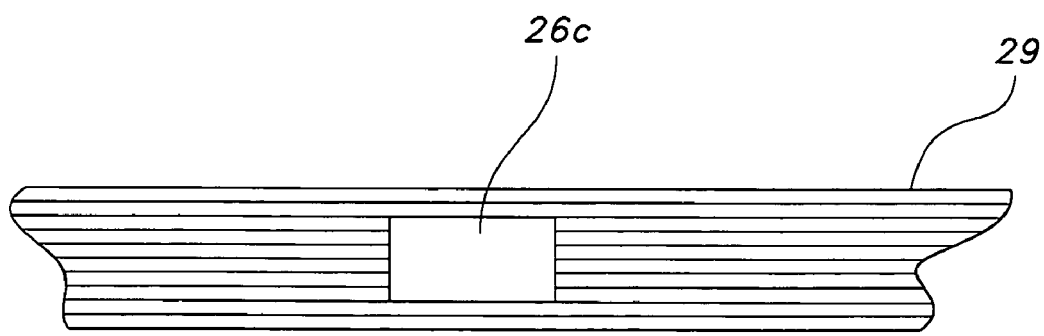
FIG. 6 shows how waveguide voids may be formed in multi-layer low-temperature co-fired ceramic (LTCC) or silicon substrate stack ups.

Waveguide subarray combiner 20 construction techniques include injection molding/plated plastic, machining, and electroforming. Dielectric waveguides can be made in several ways, such as embedded within multi-layer PWB materials, dielectric deposition and other techniques known in the art. Waveguide voids 26c may be formed in multi-layer low-temperature co-fired ceramic (LTCC) or silicon substrate stack ups 29 as shown in FIG. 6. The air-filled waveguide 26c may be rectangular or ridged and is formed during the LTCC fabrication process. The waveguide 26c may also be dielectric filled through potting techniques.

Subarray bias supply and control lines (not shown) may be arranged on the subarray module 15 perimeter and are supplied from bias/control lines 24 in FIG. 1. Thermal vias within the stacked layers provide a z-axis path for heat transfer from the T/R modules 13 to the waveguide metallization. The subarray bias and control lines may also be placed at any location in the plane of the subarray module 15 where there is space between the feed waveguides and in areas where no T/R module 13 sub-circuits exist vertically through the layers. The bias and control lines 24 and isolating dielectric sheet or film are disposed on high thermal conductivity material 22 that forms a second layer feed structure 31 shown completely in FIG. 7. A waveguide 27 formed between the high thermal conductivity material 22 such as copper tungsten, aluminum silicon carbide, aluminum/graphite composite, copper/diamond composite, etc. feeds the waveguide subarray combiner 20 attached to each subarray module 15. Conventional printed wiring board technology may be used to provide the bias and control lines 24. The waveguide subarray combiner 20 can function as a subarray level heat transfer mechanism as discussed below.

Figure 7:
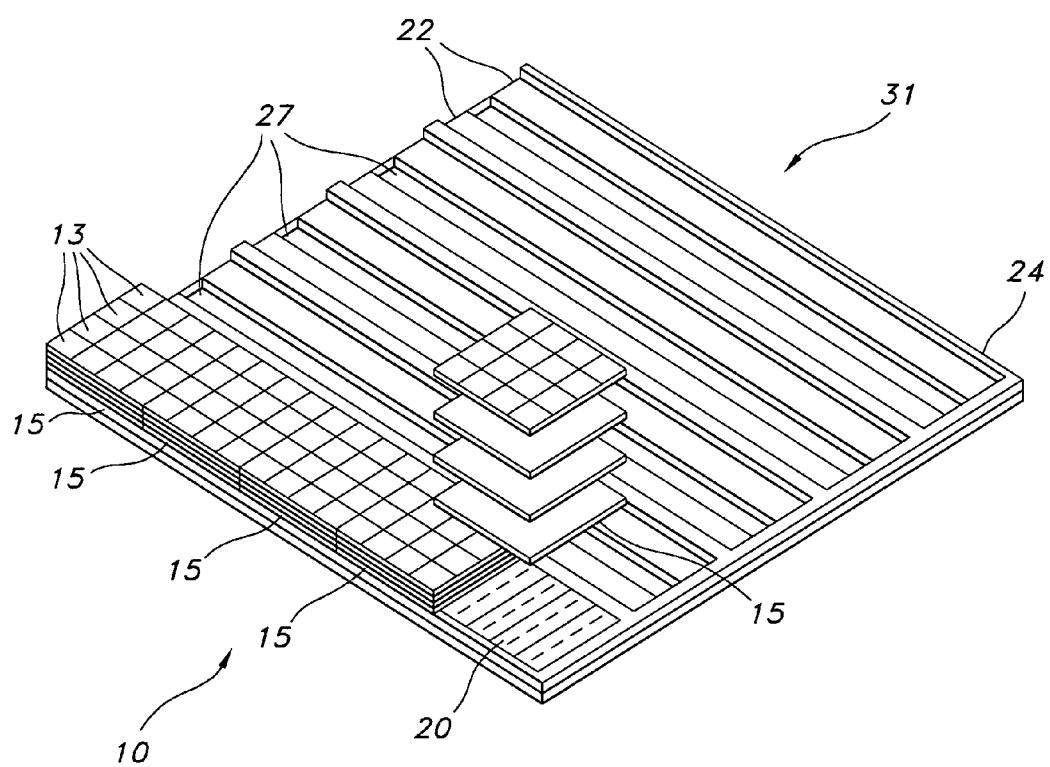
FIG. 7 illustrates the wafer-scale heterogeneous layered active electronically scanned array formed by tiling subarray modules in an m×m array.

The wafer-scale heterogeneous layered active electronically scanned array (ESA) 10, shown in FIG. 7, is formed by tiling subarray modules 15 in an m×m array. Five subarray modules 15 are shown in exemplary fashion with possible positions for 20 more thereby forming a 5×5 ESA 10 in FIG. 7. Any number can be used to form an m×n or m×m modular and scalable ESA 10 and be within the scope of the present invention. Arbitrary shapes for the ESA 10, such as square, rectangular, elliptical, or circular, can be realized through the tiling process. Furthermore each subarray module 15 is shown as a 4×4 array of T/R modules 13 as in FIG. 1. As previously discussed the subarray module may contain any number of T/R modules 13.

The second layer feed structure 31 is formed with low-loss ridge waveguides 27 between the high thermal conductivity material 22 to supply each subarray module 15 in the ESA 10 of FIG. 7. The top wall of a waveguide 27 is formed from the subarray combiner 20 bottom broadwall 25. The bottom and side walls of the waveguide 27 are formed from U-channel metallization, plating, electroforming, etc. U-channel pipes may also be bonded between adjacent high thermal conductivity materials 22. Waveguide structures for waveguides 27 other than single ridge waveguide may be utilized, such as dielectrically loaded rectangular waveguide, dielectrically loaded single ridge waveguide, dielectrically loaded double ridge waveguide, low-loss printed feeds such as coplanar waveguide and fin line, and dielectric (non-metallic) waveguides such as fiber optic cable.

The second layer feed structure 31 combines the subarray modules 15 together to form the ESA 10 by means of tiling the subarray modules 15 together. The subarray waveguide combiner 20 for each subarray module 15 is fed from waveguides 27 formed in the second layer feed structure 31. The second layer feed structure 31, for example a contiguous slotted waveguide array, couples energy into the subarray waveguide combiners 20. This coupling mechanism is realized by means of either E-field probes or waveguide aperture slot coupling, as previously described relative to FIG. 1. The large contiguous waveguide manifold of the second layer feed structure 31 couples energy into each of the subarray modules 15 individual subarray waveguide combiners 20. The subarray waveguide combiners 20 in turn couple energy into their respective T/R modules 13.

Bias and control to each subarray module 15 is supplied by lines 24 within the second layer feed structure 31. These bias and control lines 24 can be a conventional printed wiring board (PWB) assembly that is adhesively attached to the second layer feed structure 31. Alternatively, it is possible to make an integrated assembly by means of dielectric deposition and metallic circuit trace fabrication techniques to produce the bias and control lines 24 on the second layer feed structure 31 using methods similar to those previously described for the BCB—Cu stack up for the subarray module 15.

A common input/output feed manifold (not shown) may be used to feed the second layer feed structure 31 waveguides 27. The feed manifold may be a corporate feed, a slotted waveguide feed, a series feed or a parallel feed manifold.

Integrated beam steering control can be used for subarray module 15 beam steering with a second layer beam steering computer (not shown). This approach is attractive because it radically reduces the number of interconnect lines 24 required for an electrically large array since parallel bus digital connections are local to each T/R module 13, and each T/R module 13 can be sent digital control commands by means of high speed serial bus technologies. The second layer beam steering computer, the master computer that controls each of the subarrays 15 collectively, can be attached and connected to the ESA 10 in the following ways. An underside mount on the bottom layer under the second layer feed structure 31 in FIG. 7 may be used. The second layer beam steering computer can be a total separate module that is connected to the ESA 10 of FIG. 7 with the appropriate digital control, bias and ground buses/connectors.

The electronically scanned array (ESA) antenna 10 of FIG. 7 and the subarray modules 15 of FIG. 1 are fabricated by stacking multiple layers (12, 14, 16, and 18) of functionality using die stacking or wafer level packaging approaches. One of the challenges of using this approach to develop a device such as this is its thermal management. Second level thermal management in waveguide combiner 20 is possible with an aperture level heat transfer mechanism. If conventional metallic waveguide is used, the waveguide can be designed in such a way as to make it a natural thermal heat sink. Convection fins can be integrated to the bottom of the second layer waveguide feed structure 31 and either natural or forced air (blown air) can be used. It is also possible to use a thermoelectric cooler or liquid cooled heat sink that attaches to the back side of the second layer waveguide feed structure 31 for thermal management.

Figure 8:
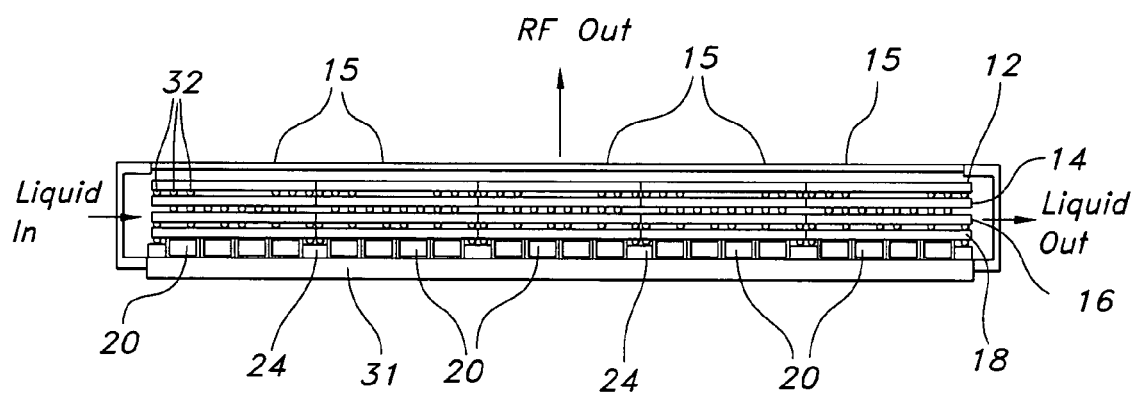
FIG. 8 illustrates a thermal management approach for the ESA of FIG. 7.

To describe the thermal management approach shown in FIG. 8, the ESA 10 of FIG. 7 is shown in cross section. The subarray modules 15 are fabricated in individual layers with the antenna layer 12, switch 2 layer, PA layer 16, and LNA bottom layer 18 stacked on each other to form the multilayer stack. The waveguide combiners 20 feed each of the subarray modules 15 with control and bias provided by lines 24 and all located on the second layer waveguide feed structure 31. These layers may be individual die, multiple die, or entire wafers as shown in FIG. 8. The individual layers are assembled using solder joints 32 to provide electrical interconnect between the layers. These solder joints 32 create small channels between the different layers, with channel heights equal to the solder joint height. Dielectric fluid pumped through the channels of the entire ESA 10 provides thermal management to the ESA 10 through either single phase or two-phase cooling. Similar liquid cooling concepts may be utilized for the second layer waveguide feed structure 31. Note that this approach can be applied to any high powered, stacked architecture, not only for an ESA 10.

It is believed that the wafer-scale heterogeneous layered active electronically scanned array with the low-loss integrated waveguide feed of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A wafer-scale heterogeneous layered active electronically scanned array (ESA) comprising:
    a plurality of subarray modules;
    a plurality of waveguide subarray combiners for feeding the plurality of subarray modules; and
    a second layer feed structure for forming the plurality of subarray modules into the ESA and for feeding the plurality of waveguide subarray combiners.

2. The wafer-scale heterogeneous layered active ESA of claim 1 wherein each of said subarray module of the plurality of subarray modules comprises a multilayer stack forming a plurality of transmit/receive (T/R) modules and wherein each of the T/R modules of the plurality of T/R modules is fed by the waveguide subarray combiner of the plurality of waveguide subarray combiners.

3. The wafer-scale heterogeneous layered active ESA of claim 2 wherein the multilayer stack comprises an antenna layer, a switch 2 layer, a power amplifier (PA) layer, and a switch 1 and low noise amplifier (LNA) layer.

4. The wafer-scale heterogeneous layered active ESA of claim 2 wherein each of said waveguide subarray combiner of the plurality of waveguide subarray combiners comprises a waveguide assembly bonded to a bottom layer in the multilayer stack wherein a ground plane on the bottom layer forms a top waveguide broadwall of the waveguide subarray combiner.

5. The wafer-scale heterogeneous layered active ESA of claim 4 wherein the waveguide subarray combiner further comprises sidewalls and a bottom waveguide broadwall.

6. The wafer-scale heterogeneous layered active ESA of claim 4 wherein the waveguide subarray combiner comprises one of single ridge waveguides, dielectric filled rectangular waveguides, dielectric filled single ridge waveguides, dual ridge waveguides, dielectric filled dual ridge waveguides, and dielectric waveguides.

7. The wafer-scale heterogeneous layered active ESA of claim 4 wherein the waveguide subarray combiner feeds the T/R modules in the subarray module using one of electric field probe coupling and aperture slot coupling.

8. The wafer-scale heterogeneous layered active ESA of claim 1 wherein the second layer feed structure comprises a plurality of waveguides formed between high thermal conductivity materials to feed the waveguide subarray combiners attached to the plurality of subarray modules by means of one of E-field probes and aperture slot coupling.

9. The wafer-scale heterogeneous layered active ESA of claim 8 wherein the second layer feed structure further comprises bias and control lines disposed on the high thermal conductivity material to supply the subarray modules.

10. The wafer-scale heterogeneous layered active ESA of claim 1 further comprising a second layer beam steering computer for subarray module beam steering by commands to the T/R modules in the plurality of subarray modules.

11. A wafer-scale heterogeneous layered active electronically scanned array (ESA) comprising:
    a plurality of subarray modules wherein each of said subarray module of the plurality of subarray modules comprises a multilayer stack forming a plurality of transmit/receive (T/R) modules;
    a plurality of waveguide subarray combiners for feeding the plurality of subarray modules wherein the T/R module of the plurality of T/R modules is fed by the waveguide subarray combiner of the plurality of waveguide subarray combiners; and
    a second layer feed structure for forming the plurality of subarray modules into the ESA and for feeding the plurality of waveguide subarray combiners.

12. The wafer-scale heterogeneous layered active ESA of claim 11 wherein each of the waveguide subarray combiner of the plurality of waveguide subarray combiners comprises a waveguide assembly bonded to a bottom layer in the multilayer stack wherein a ground plane on the bottom layer forms a top waveguide broadwall of the waveguide subarray combiner.

13. The wafer-scale heterogeneous layered active ESA of claim 12 wherein the waveguide subarray combiner further comprises sidewalls and a bottom waveguide broadwall.

14. The wafer-scale heterogeneous layered active ESA of claim 12 wherein the waveguide subarray combiner comprises one of single ridge waveguides, dielectric filled rectangular waveguides, dielectric filled single ridge waveguides, dual ridge waveguides, dielectric filled dual ridge waveguides, and dielectric waveguides.

15. The wafer-scale heterogeneous layered active ESA of claim 12 wherein the waveguide subarray combiner feeds the T/R modules in the subarray module using one of electric field probe coupling and aperture slot coupling on the top waveguide broadwall.

16. The wafer-scale heterogeneous layered active ESA of claim 12 wherein the second layer feed structure comprises a plurality of waveguides formed between high thermal conductivity materials to feed the waveguide subarray combiners attached to the plurality of subarray modules by means of one of E-field probes and aperture slot coupling on the bottom waveguide broadwall.

17. The wafer-scale heterogeneous layered active ESA of claim 16 wherein the second layer feed structure further comprises bias and control lines disposed on the high thermal conductivity material to supply the subarray modules.

18. The wafer-scale heterogeneous layered active ESA of claim 11 further comprising a second layer beam steering computer for subarray module beam steering by commands to the T/R modules in the plurality of subarray modules.

19. The wafer-scale heterogeneous layered active ESA of claim 11 wherein the multilayer stack in each of the subarray module is fabricated in individual layers with solder joints to provide electrical interconnect between the individual layers thereby creating channels between the individual layers with channel heights equal to the solder joint height to provide for flow-through dielectric fluid cooling.

20. A wafer-scale heterogeneous layered active electronically scanned array (ESA) comprising:
    a plurality of subarray modules;
    a plurality of waveguide subarray combiners for feeding the plurality of subarray modules; and
    a second layer feed structure for forming the plurality of subarray modules into the ESA wherein the second layer feed structure comprises a plurality of waveguides to feed the waveguide subarray combiners attached to the plurality of subarray modules.

21. The wafer-scale heterogeneous layered active ESA of claim 20 wherein the plurality of waveguides in the second layer feed structure are formed between high thermal conductivity material from U-channel metallization forming bottom and side walls and with bottom waveguide broadwalls of the plurality of waveguide subarray combiners forming top walls.

22. The wafer-scale heterogeneous layered active ESA of claim 21 wherein the plurality of waveguides in the second layer feed structure feed the plurality of waveguide subarray combiners by means of one of E-field probes and aperture slot coupling through the top walls.

23. The wafer-scale heterogeneous layered active ESA of claim 21 wherein the plurality of waveguides in the second layer feed structure are one of single ridge waveguides, dielectrically loaded rectangular waveguides, dielectrically loaded single ridge waveguides, dielectrically loaded double ridge waveguides, coplanar waveguide, fin line, and dielectric waveguides.

* * * * *